May 17, 1932. T. I. DUFFY 1,858,541
AUTOMOBILE BUMPER
Filed May 5, 1928
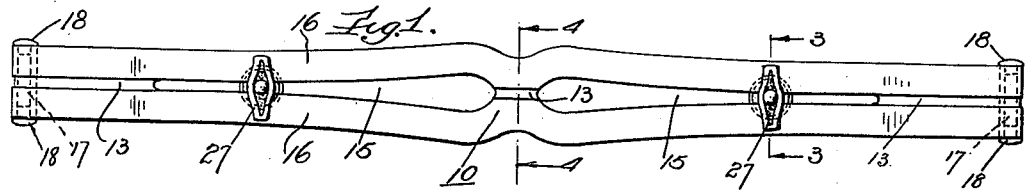
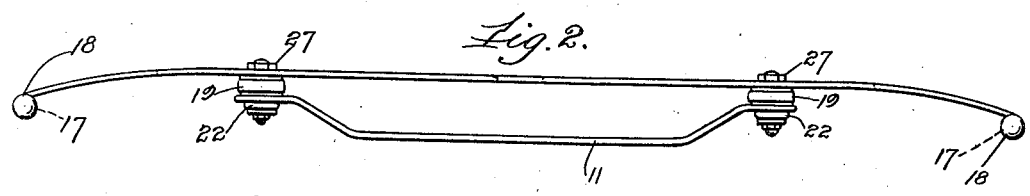
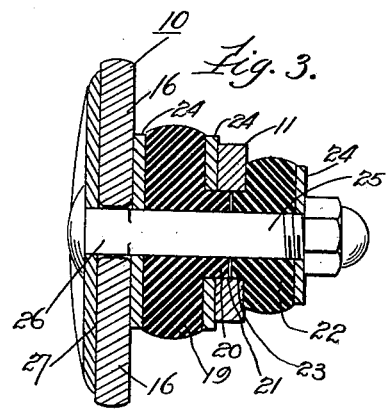
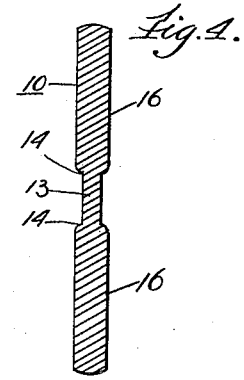
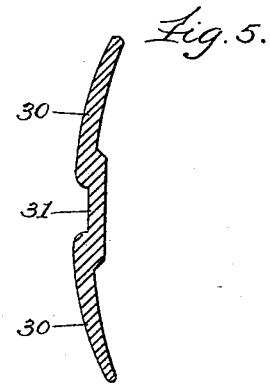
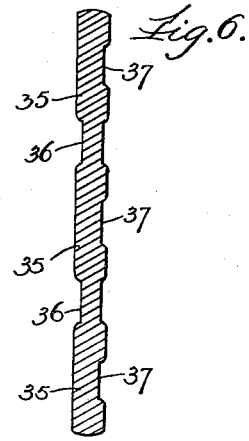
Inventor:
Thomas I. Duffy.
by his Attorneys.

Patented May 17, 1932

1,858,541

UNITED STATES PATENT OFFICE

THOMAS I. DUFFY, OF DETROIT, MICHIGAN, ASSIGNOR, BY MESNE ASSIGNMENTS, TO WILLIAM J. McINTYRE, OF DETROIT, MICHIGAN

AUTOMOBILE BUMPER

Application filed May 5, 1928. Serial No. 275,397.

The object of this invention is to provide an automobile bumper of improved construction, combining maximum strength with minimum of metal. Another object is to form from a single piece of stock, a plurality of impact bars integrally connected together in a manner to increase the effective impact area of the bumper. A further object is to provide a bumper which is durable, and ornamental and which may be cheaply manufactured. A still further object of my invention is to provide an improved mounting for the impact member, adapted to absorb shock and dampen vibration as between the impact member and its support. It consists in certain features and elements of construction, herein shown and described, as indicated by the claims.

In the drawings:

Figure 1 is a front view of an automobile bumper embodying the present invention.

Figure 2 is a bottom view of the bumper.

Figure 3 is a section showing my improved mounting, taken as indicated at line, 3—3, on Figure 1.

Figure 4 is a vertical cross sectional view through the impact member taken at line, 4—4, in Figure 1.

Figure 5 is a cross sectional view of an impact member of modified construction.

Figure 6 is a cross sectional view of a further modification.

In general, the automobile bumper embodying this invention consists of an impact member, 10, formed from a single piece of stock, mounted to a supporting bracket, 11, which may be secured to the front end of the automobile frame. The constructional features of the impact member will be best understood from a description of the method of forming the same, which is briefly as follows:

A piece of ribbon stock of uniform width is rolled to form therein a continuous web, 13, depressed below the surface of the stock with the connecting edges, 14, between the surface of the stock and the web, beveled or rounded as shown in the drawings. The outer edges of said stock may be rounded or formed to suit. It is to be undertsood that the sequence of the following steps may be interchanged if desired. The webbed-ribbon stock is cut into suitable lengths; from each of these lengths, then, portions of the web, 13, are removed, flush with the rounded edges, 14, forming openings such as indicated at 15. For purposes of clarity, the portions of the impact-member or opposite sides of the web may be termed "impact bars", 16. The openings formed in the web may be arbitrarily located to suit, or to permit forming of a desired design and as shown in Figure 1, these openings terminate short of the middle and of the ends of the impact member. Certain portions of the bars opposite the openings, 15, may be spread apart in a manner readily understood by those skilled in the art, to form suitable ornamental designs and also at the same time increase the effective impact-receiving area of the bumper as shown. This construction forms in effect a multi-bar impact member while still retaining the advantages of a single bar impact member. The bars may then be curved convexly if desired and as shown, the end portion curved rearwardly.

To provide a further finished appearance to this impact member the ends thereof may be bent to form closed eyes, 17, with cap plugs, 18, driven in each end of the eye to simulate the ends of bolts securing together the bars of the usual multi-bar impact members.

I provide an improved mounting for the impact member on the supporting bracket, 11, to eliminate or dampen vibration, and noises incident thereto, which heretofore were due to the direct contact of the parts. As shown in Figure 3, this mounting involves interposing a block, 19, of resilient material such as rubber, between the mounting member and bracket, 11, with a reduced portion, 20, of said block extending into an opening, 21, of said bracket, and a co-operating block, 22, of like material positioned on the opposite side of the bracket with a reduced shoulder, 23, extending in the opening, 21, short of contact with the shoulder of the other block. These blocks of resilient material are mounted between metal washers, 24, to insure pressure over the entire area of each block, and said washers held in position by a carriage bolt, 25, extending through the reduced portions, 20 and 23, of the rubber, with its square shank, 26, engaged in an ornamental clamping plate, 27, and in the opening, 15, between the impact bars, 16, being thus held against rotation; the head of the bolt is seated on the clamping plate, 27, which extends over the front surface of the impact member. This connection completely insulates the impact member from the supporting bracket and thus dampens and to a great degree eliminates the transmission of vibratory impulses from one part to the other. And even the force of collision received by the impact member will be partially absorbed, or at least the shock transmitted to the automobile frame through the resilient connection of the supporting bracket will be somewhat reduced.

The bolt, 25, will not ordinarily be distorted or sheared off by forceful shocks against the impact member, but by virtue of the resilient mounting blocks, 19 and 22, the bolt is permitted to shift in position to accommodate itself to the flexure of the impact member and supporting bracket.

The remaining or connecting web portions insure a sturdy and durable impact member, while the proper flexiblility is provided by the openings where the web portions have been removed.

Figure 5 shows an impact member of modified cross section, wherein the impact bars, 30, connected by a web, 31, are rolled to a convex cross sectional formation. This formation taken with the longitudinal curvature of the bars, as shown in Figure 1, greatly enhances the strength of the member for a given amount of metal. Further, as shown, the bars are tapered from the web toward the outer edges which also reduces the amount of metal without substantial sacrifice in rigidity.

Figure 6 merely illustrates one of many possible modifications of cross sectional formation of an impact member embodying this invention. The impact member as shown in this view is composed of a plurality of impact bars, 35, integrally connected by web portions, 36, with recesses, 37, formed in the back side of the bars to save metal. It is to be understood that the number, shape and proportions of the bars may be varied to suit the particular requirements.

An impact member made in accordance with my invention is cheap to manufacture, in that the entire member is an integral unit which reduces handling of the parts and operations, this being especially important in finishing the bars.

I claim:—

1. A vehicle bumper comprising an integral impact member having a web portion depressed below the impact receiving surface of said member, a portion of said web being removed to provide an opening through said member and the remaining portion of said web being of less thickness than the remainder of said member.

2. A vehicle bumper comprising an integral impact member having a depressed web portion intermediate its width, and having a portion of said web removed to form an opening, the portions of said impact member adjacent the omitted web portion being spaced apart a greater distance than the portions of said member adjacent the remaining web portions.

3. In a vehicle bumper, an impact member consisting of a plurality of vertically spaced impact bars integrally connected together by depressed web portions at a plurality of points, said bars being tapered in cross section away from said web portions.

4. The method of making a vehicle bumper consisting in rolling a continuous web in an impact member depressed below the impact receiving surface of said member, and removing portions of said web.

5. The method of making a vehicle bumper consisting in rolling in a continuous ribbon of uniform width, a web of uniform width depressed below one surface thereof, cutting said ribbon into suitable lengths and removing portions of the web.

6. The method of making a vehicle bumper consisting in forming a web in an impact member depressed below the impact receiving surface, removing a portion of said web and spreading apart the portions of said member adjacent the removed portion of said web.

7. In a vehicle bumper, an impact member and a supporting member with a bolt fitted snugly in one of said members and loosely in the other; means through which the bolt engages the latter member in a manner adapted to permit flexure thereof without bending the bolt, and a cushion of yielding resilient material interposed between the two members.

8. In a vehicle bumper, an impact member; a supporting member; and means connecting them, comprising a bolt fitted snugly in the impact member and loosely in the supporting member; a cushion of resilient yielding material interposed between the two members and surrounding the bolt; a mass of such material occupying the clearance space between the bolt and the supporting member, and an additional quantity of such material clamped between the bolt and the supporting member, whereby flexure of either member with respect to the other is possible without bending of the bolt, and the members are insulated from each other in respect to vibration.

9. The method of making a vehicle bumper which consists in rolling in a continuous ribbon of metal a web of reduced thickness, cutting said ribbon into suitable bumper lengths and removing portions of the web in each length.

10. In a vehicle bumper, an impact member consisting of a plurality of vertically spaced impact bars integrally connected together by web portions at a plurality of points, said web portions being of less thickness than said impact bars.

11. A vehicle bumper comprising an impact member and a support member, means for connecting said impact and support members together, and resilient non-metallic means surrounding said connecting means and interposing a resilient insulating cushion between all parts of said connecting means and one of said members and separating said members from contact with each other.

12. A vehicle bumper comprising an impact member and a support member, means for connecting said impact and support members together, and resilient non-metallic means surrounding said connecting means and interposed between all parts of said connecting means and one of said members and between said members, said connecting means being adjustable to regulate the compression of said non-metallic means whereby the vibratory period of one of said members may be adjusted relative to the vibratory period of the other of said members.

13. A vehicle bumper comprising an impact member and a support member, metallic elements extending between and connecting said members, resilient non-metallic means interposed between said impact and support members and between all parts of said metallic connecting elements and one of said members.

14. A vehicle bumper comprising an impact member and a support member, connecting means therefor comprising a bolt having one end extending through and engaging an aperture in one of said members and having its other end extending through an enlarged aperture in the other member, a resilient non-metallic member positioned between and spacing said members and surrounding said bolt and having a reduced portion extended into said enlarged aperture, a second non-metallic member surrounding the free end of said bolt and engaging the side of said other member and having a reduced portion extending into said enlarged aperture.

THOMAS I. DUFFY.